Nov. 8, 1966  M. A. WESSELS  3,284,349
SKIMMER
Filed Nov. 12, 1963
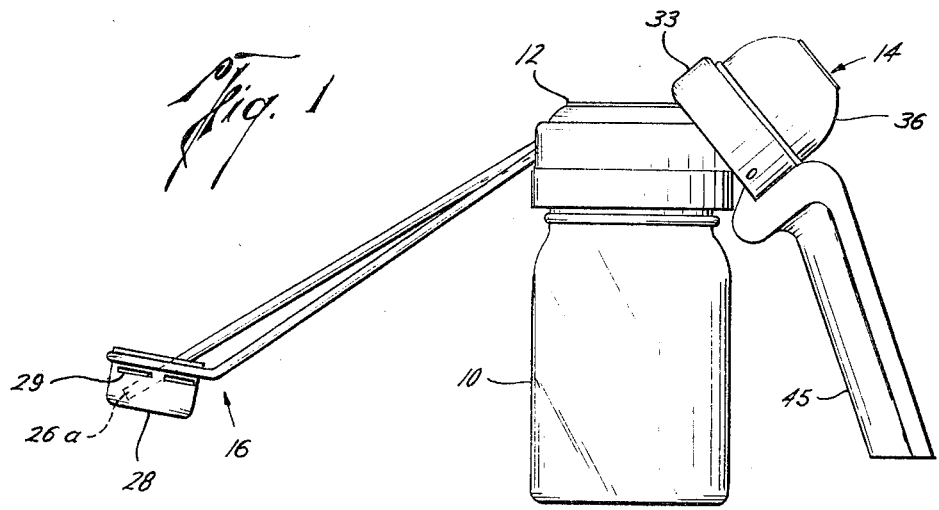
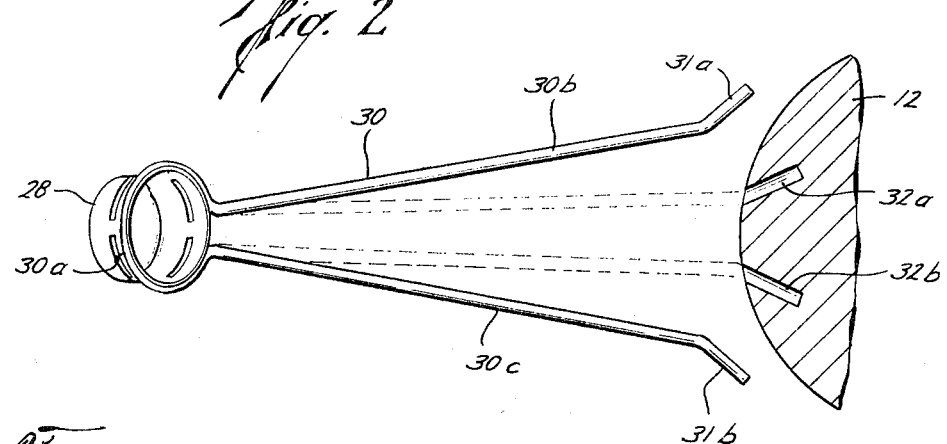
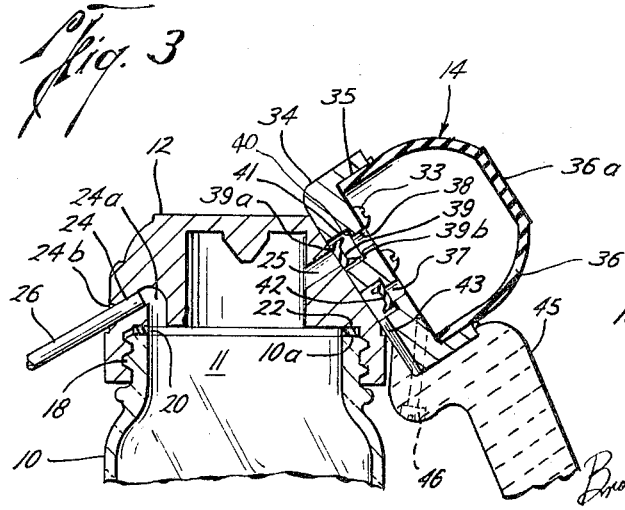
Milton A. Wessels
INVENTOR.
BY
ATTORNEYS

United States Patent Office 3,284,349
Patented Nov. 8, 1966

3,284,349
SKIMMER
Milton A. Wessels, 10322 Moorberry, Houston, Tex.
Filed Nov. 12, 1963, Ser. No. 323,038
6 Claims. (Cl. 210—136)

This invention relates to a skimmer for removing a liquid from the surface of another where the liquids are of different densities and, at least, partially stratified in the vessel which contains them.

Skimmers of the type to which this invention relates are useful for removing any liquid from the surface of another. However, they have a particular utility in the kitchen where it is frequently necessary to remove the relatively thin layers of grease and fats which collect on the surface of soups, chili, broths, etc. while they are being cooked. The grease and fats which are produced during cooking are not only a problem to remove without also removing a large amount of the liquid it is desired to keep, but they are also a problem to dispose of and to wash from the apparatus used to remove them.

It is an object of this invention to provide a skimmer which can quickly and efficiently remove a relatively thin layer of liquid from the surface of another.

It is another object of this invention to provide a skimmer which can be quickly and easily disassembled, cleaned and reassembled.

It is another object of this invention to provide a skimmer which makes use of an inexpensive member to provide a conduit for the liquid being removed which can be disposed of after each use to thereby greatly simplify the cleaning and maintenance of the apparatus.

It is another object of this invention to provide a skimmer which exposes only a minimum amount of surface to the liquid being skimmed so that the surface which needs to be cleaned will be held to a minimum.

It is another object of this invention to provide a skimmer of compact arrangement which can be operated with one hand.

It is another object of this invention to provide a pressure operated skimmer having a check valve which occupies a minimum amount of space.

Other objects, features, and advantages of this invention will be apparent to one skilled in the art from a consideration of this specification, attached drawings, and appended claims.

A detailed description is set out below of the embodiment of the invention shown in the drawings in which:

FIG. 1 is a side elevational view of a skimmer constructed in accordance with this invention showing the skimmer in its assembled state and ready for use;

FIG. 2 is a top plan view of the collecting cup assembly of the skimmer as it appears when removed from the rest of the skimmer; and FIG. 3 is a partial vertical sectional view through the suction head and suction cup assembly of the skimmer.

As shown in the drawings, the skimmer includes container 10 to receive the skimmed liquid, and suction head 12 attached to the container with suction cup assembly 14 and collecting cup assembly 16 mounted thereon.

Container 10 can be any vessel made from any desired material with any convenient shape. If the liquid to be skimmed is hot, such will be the case if grease is being skimmed from soup, etc., the container should be made from a material which will withstand heat, such as heat tempered glass, etc. A convenient container is a conventional fruit jar of the type used to preserve foods, etc., since it is capable of withstanding heat and is also provided with a large opening 11 and external threads 18. Glass fruit jars are also very easy to clean after use which also makes them a very convenient container for use with the skimmer.

As seen in FIG. 3, suction head 12 is a cup-shaped member provided with internal threads to engage threads 18 on container 10 for conveniently connecting the head to the container. To prevent air from passing into the container through this threaded joint which, as will be seen below, would make the skimmer inoperative, rubber gasket 20 is located between the upper end 10a of the container and internal shoulder 22 on suction head 12 to provide a seal between the two members.

Besides being open ended so that it can communicate with the open end 11 of the container 10, suction head 12 is also provided with a first passageway 24 and a second passageway 25. First passageway 24 is located so that its longitudinal axes make an acute angle with the outside surface of the head so that suction tube 26, located therein will extend downwardly from the suction head at an angle. The inner end 24a of passageway 24 turns downwardly so that its longitudinal axis at this point is approximately parallel to the longitudinal axis of the container. In this way, liquid passing through the passageway will be deflected and diverted downwardly into container 10. In this way the suction head, for the most part, will remain free of the liquid being skimmed which simplifies to a great extent the cleaning of the apparatus after its use. This also reduces the possibility of the liquid being skimmed traveling across the cup and entering passageway 25 and interfering with the operation of the suction cup assembly 14.

It is one of the objects of this invention to provide a skimmer which is easily cleaned. Obviously, suction tube 26 would not be easily cleaned particularly if it is filled with solidified grease, such as the type skimmed from the surface of soup, etc. Therefore, in the preferred embodiment of this invention, suction tube 26 comprises a thin, walled tube of paper, such as a drinking straw or soda straw as they are sometimes called, which can be inserted in passageway 24, when it is desired to use the apparatus and after its use, thrown away and replaced with a fresh straw.

To obtain the necessary seal between tube 26 and suction head 12, passageway 24 is of a diameter slightly less than the outside diameter of the tube to be used. Thus, when the tube is inserted in the passageway it will be slightly compressed by the passageway which produces the necessary seal between the two, and also provides sufficient holding friction to support the tube and hold it within the passageway. A lead-in chamfer 24b is provided at the entrance of passageway 24 to facilitate insertion of the tube into the passageway.

As stated above, a paper drinking straw is preferred for tube 26, however, obviously, tubes of material other than paper can be used which are also sufficiently inexpensive to allow their being replaced after each use.

Since it would be very difficult to hold the end of tube 26 in the proper position relative to the layer of liquid being skimmed, means are provided to collect the liquid being skimmed in an auxiliary container from which it can be drawn through the tube into the container. In the embodiment illustrated, a small collecting cup 28 is removably attached to the suction head through a U-shaped rod 30. Cup 28 is provided with slots 29 just below where the cup is engaged by rod 30, through which the liquid being removed can flow into the cup and be collected in sufficient quantities to cover the end of suction tube 26.

Cup 28, of course, is located so that the lower end 26a of tube 26 is located adjacent the bottom of the cup. In this way, by emersing collecting cup 28 in the liquid until the upper surface of the liquid is just flowing through slots 29 into the cup, an extremely thin layer of grease can be removed from the surface of the liquid while removing a minimum amount of the liquid which it is desired not to remove. For example, when skimming the grease off soup with this arrangement the grease can be removed with a minimum amount of soup being removed.

Rod 30, which is designed to releasably hold collecting cup 28 in position somewhat below and outwardly from suction head 12, is formed from resilient material into a generally U-shaped configuration having a bight section 30a, which is circular and designed to encompass most of the periphery of the cup, and two outwardly diverging legs 30b and 30c. Suction head 12 is provided with two spaced openings 32a and 32b which are arranged so that extensions of the longitudinal axis of these openings intersect an an angle of approximately 90°. As shown in FIG. 2, these openings are spaced a distance such that when the outer ends 31a and 31b of legs 30b and 30c are inserted in the openings, cup 28 will be resiliently clamped within the bight section of the rod by the action of moving the legs toward each other. The position of the legs 30b and 30c when inserted in openings 32a and 32b is shown by dotted lines in FIG. 2. The outer ends 31a and 31b of legs 30b and 30c are bent outwardly at an angle to the longitudinal axis of the legs so that these outer portions of 31a and 31b will coincide with the longitudinal axis of openings 32a and 32b when the legs are moved together so that these end portions can be inserted in the openings. With this arrangement, the collecting cup assembly can be quickly and easily detached from the suction head 12 for disassembly and cleaning after the skimmer has been used and to allow the removal of disposable tube 26b. After cleaning, a new tube can be inserted in opening 24 and collecting cup assembly 16 can be quickly and easily reassembled in position for the next skimming operation.

Means are provided to cause a flow of air out of suction head 12 and container 11 in order that atmospheric pressure can force the liquid collected in cup 28 up through tube 26 into container 10. In the embodiment illustrated, this is accomplished by suction cup assembly 14 which is attached to suction head 12 by screws 33. The assembly comprises a base member 34 which is provided with a circular recess 35 within which is positioned the lower end suction cup 36. The suction cup is made from one of the elastomers, preferably a rubber having good memory and is generally hemispherically shaped. The diameter of circular recess 35 is slightly less than the outside diameter of the lower section of the cup 36 so that when the cup is positioned in the recess the walls of the cup will exert a force outwardly against the walls of recess 35 and form a seal therewith.

The suction cup should be made from a material having a good memory so that it can be collapsed on its flat outer end 36a by exerting force to drive the air therein out through opening 37 provided therefor in base 34 and when released it will return to its original shape and in doing so pull air through the secondary passageway 25 in suction head 12 through opening 38 in base 34. To control the flow of air into and out of interior suction cup 36, check valves are located in base 34 to allow air to enter the suction cup through port 38 and to leave through port 37 only. Any conventional check valve can be used for these purposes, however, to keep the thickness of plate 34 to a minimum, check valves as shown in FIG. 3 are employed. These check valves are identical, therefore, only one will be described in detail. They consist of a flat rectangular piece of elastomeric material, such as member 39, which controls the flow of air from passageway 25 through opening 38. Side 39a is flat whereas the opposite side is provided with protrusions 39b. Preferably there are four protrusions in all, one located at each corner of the member. By shaping the valve member in this way, when air is blowing through passageway 25 toward the cup, protrusions 39b will engage shoulder 40, provided by enlarged section 41 of opening 38, and air is free to flow between the protrusions through passageway 38 into the suction cup. However, when the suction cup is being collapsed and air is attempting to flow back through passageway 38 into passageway 25, the flat side 39a of member 39 will seal off opening 25 and prevent the flow of air therethrough. Member 42 is identical to member 39 except that it is positioned to allow air to flow out of suction cups 36 through passageways 37 and 43 to the outside of the assembly and prevent the flow of air in the opposite direction.

So that the skimmer can be operated by hand, handle 45 is attached to base 34 of the suction cup assembly by means of screw 46. In this way the operator of the skimmer can hold the device with the fingers on one hand while simultaneously collapsing suction cup 36 as required to remove sufficient air from container 10 and suction head 12 to cause atmospheric pressure to force the liquid, collected in collecting cup 28, through disposable tube 26 into the container.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A skimmer comprising, a container; a suction head connected to the container, and having a first opening and a second opening; a collecting cup having an upwardly extending wall portion over the top of which liquids are adapted to flow when the cup is submerged therein; means attaching the cup to the head; a separate disposable thin-walled tube having one end in releasable sealing engagement with the first opening in the head and extending into a lower portion of the cup; and means for removing air from the container through the second opening to cause any liquid in the cup to be forced into the container through the disposable tube and the first passageway into the container by atmospheric pressure.

2. A skimmer for removing the top liquid layer from a vessel containing partially stratified liquids having difference densities, comprising a container for the skimmed liquid; a suction head connected to the container and having a first passageway through which the liquid enters the head and is collected in the container and a second passageway through which air is removed from the container; means for removing air from the container; a collecting cup for the liquid being skimmed having an upwardly extending wall portion over the top of which liquids are adapted to flow when the cup is submerged therein; means for removably connecting the cup to the head; and a thin-walled separate disposable tube having one end located in the first liquid passageway and the other end located in a lower portion of the collecting cup to provide a removable extension for the first passageway in the suction head through which the skimmed liquid collected in the cup is forced by atmospheric pressure when air is removed from the container through the second passageway.

3. The skimmer of claim 2 in which the suction head is provided with two spaced openings and the collecting cup is removably attached to the suction head by a U-shaped rod of resilient material, having a bight section and two diverging legs the ends of which are arranged to extend into the two spaced openings in the suction head and resiliently clamp the collecting cup between the legs adjacent the bight section.

4. The skimmer of claim 3 in which projections of the longitudinal axis of the two spaced openings intersect at an angle of approximately 90° and the outer end portions of the two diverging legs are bent outwardly at an angle greater than the angle of divergence of the legs to coincide with the angle of the longitudinal axes of the openings when the outer end portions are inserted therein.

5. A skimmer, comprising, a container to receive the skimmed liquid; a suction head removably attached to the container through which the skimmed liquid can flow into the container; first and second passageways in the suction head; a collecting cup for the skimmed liquid; means removably attaching the cup to the head; a thin-walled, disposable tube having one end extending into the first passageway and one end extending into the collecting cup through which the liquid collected can flow into the suction head, said tube being made of paper and the diameter of the first passageway being slightly less than the diameter of the tube; a suction cup assembly attached to the suction head to cause air to flow from the suction head through the second passageway, including a collapsible suction cup of resilient material, and check valve means for allowing air to flow through the second passageway from the suction head into the suction cup and to allow air to flow out of the suction cup to the ambient atmosphere.

6. A skimmer, comprising, a container to receive the skimmed liquid; a suction head removably attached to the container through which the skimmed liquid can flow into the container; first and second passageways in the suction head; a collecting cup for the skimmed liquid; means removably attaching the cup to the head; a thin-walled, disposable tube having one end extending into the first passage and one end extending into the collecting cup through which the liquid collected can flow into the suction head; a suction cup assembly attached to the suction head to cause air to flow from the suction head through the second passageway, including a collapsible suction cup of resilient material, check valve means for allowing air to flow through the second passageway from the suction head into the suction cup and to allow air to flow out of the suction cup to the ambient atmosphere; and a handle arranged to allow the skimmer to be held and operated with one hand.

References Cited by the Examiner
UNITED STATES PATENTS

| | | | |
|---|---|---|---|
| 972,075 | 10/1910 | Freeman | 141—26 X |
| 1,328,866 | 1/1920 | Yeatter | 137—172 X |
| 2,143,782 | 1/1939 | Lewy | 210—470 |

REUBEN FRIEDMAN, *Primary Examiner.*

F. A. SPEAR, *Assistant Examiner.*